H. G. LATIMER, Jr.
AUTOMOBILE SEAT.
APPLICATION FILED JAN. 9, 1919.
1,312,501.
Patented Aug. 5, 1919.
2 SHEETS—SHEET 1.
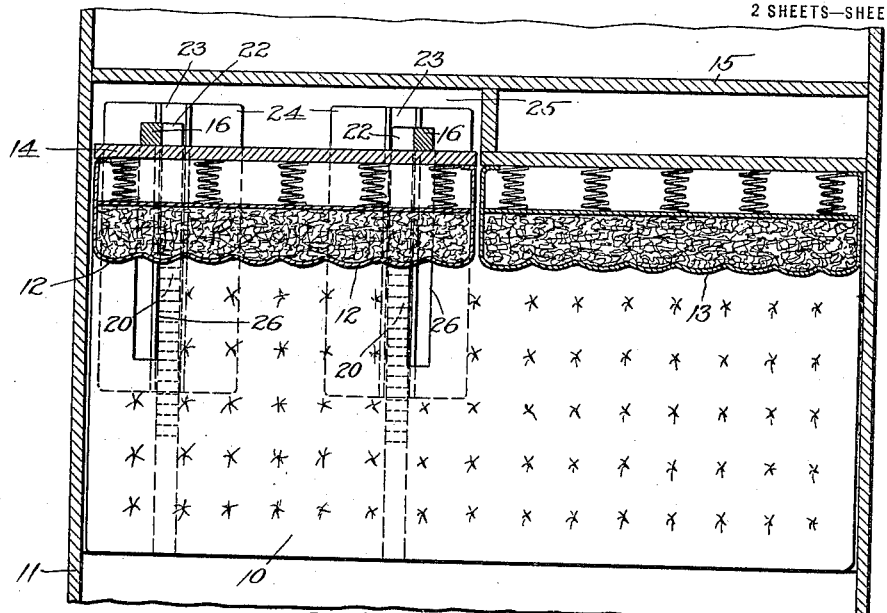
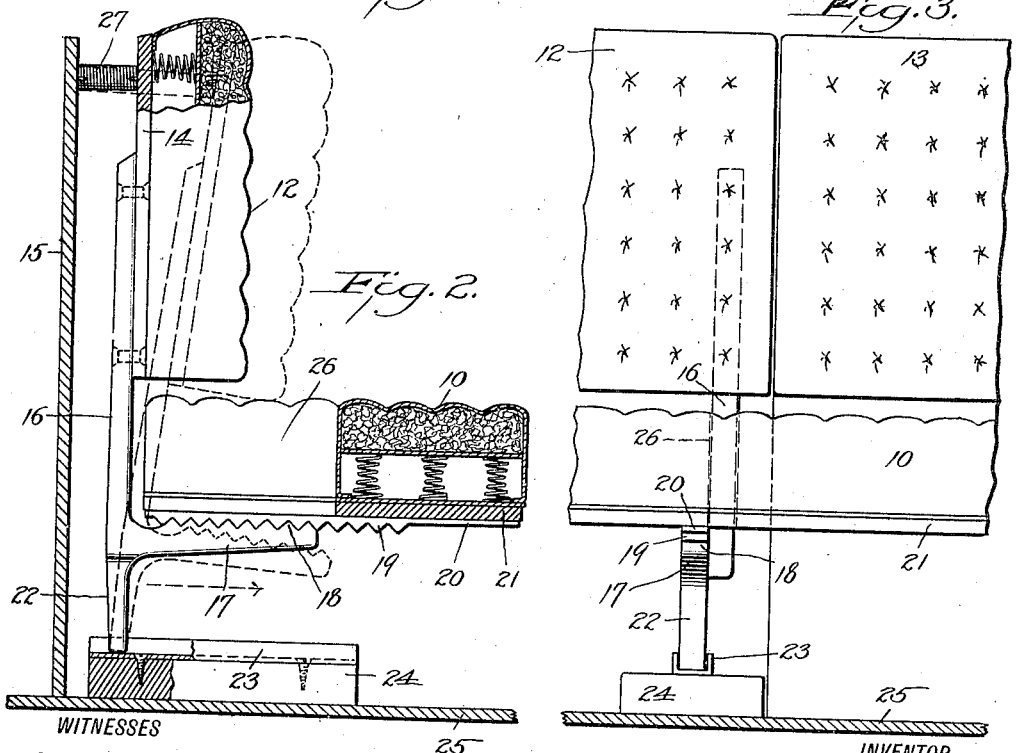

H. G. LATIMER, Jr.
AUTOMOBILE SEAT.
APPLICATION FILED JAN. 9, 1919.

1,312,501.

Patented Aug. 5, 1919.
2 SHEETS—SHEET 2.

WITNESSES

INVENTOR
H. G. LATIMER Jr.,
BY
ATTORNEYS

UNITED STATES PATENT OFFICE.

HENRY GOULD LATIMER, JR., OF AUBURN, NEW YORK.

AUTOMOBILE-SEAT.

1,312,501.  Specification of Letters Patent.  Patented Aug. 5, 1919.

Application filed January 9, 1919. Serial No. 270,336.

*To all whom it may concern:*

Be it known that I, HENRY GOULD LATIMER, Jr., a citizen of the United States, and a resident of Auburn, in the county of Cayuga and State of New York, have invented a new and Improved Automobile-Seat, of which the following is a specification.

Many who drive automobiles lack size to comfortably handle the brakes and clutches without sitting forward on the driver's seat and therefore require for comfort the use of a pillow or cushion back of them and in front of the usual cushion of the seat back.

The general object of my invention is to provide an automobile driver's seat in which the back cushion is adjustable forward or back independently of the seat to thereby accommodate the seat and back to drivers of different sizes.

More specifically, the invention has for its object to provide the adjustable back cushion with rigid supporting means having floor support and means to effect an interlocked engagement between the seat and the supporting means of the back cushion in any given adjustment of the back.

Reference is to be had to the accompanying drawings forming a part of this specification, it being understood that the drawings are merely illustrative of one example of the invention.

Figure 1 is a sectional plan view of portions of an automobile and front seats including a driver's seat embodying my invention in one form;

Fig. 2 is a partly sectional side elevation thereof;

Fig. 3 is a fragmentary front view thereof;

Figure 4:
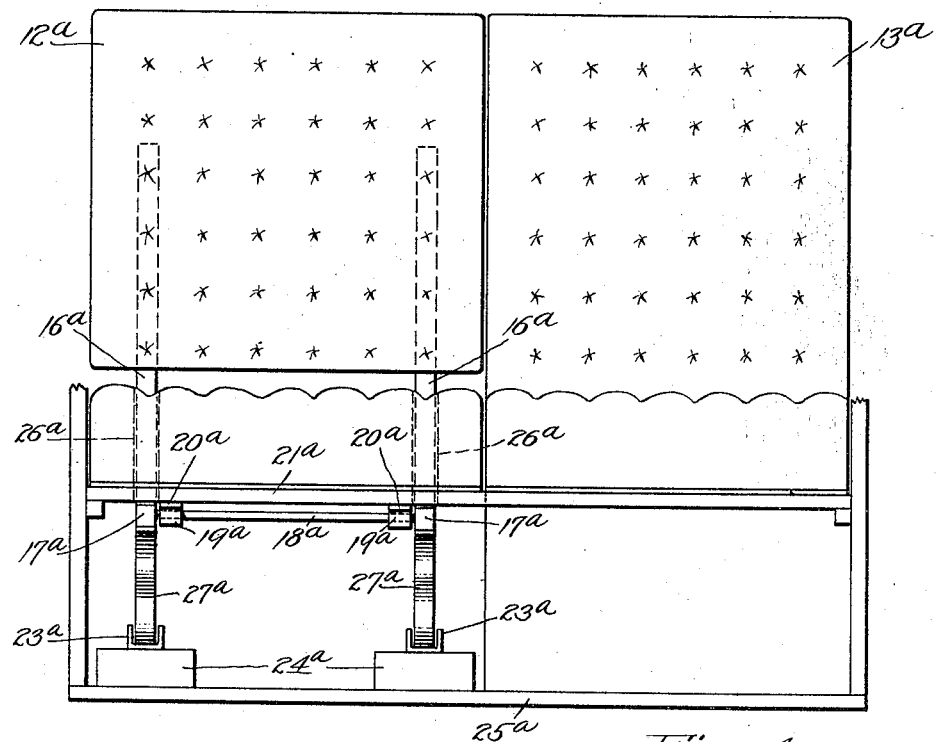
Fig. 4 is a front view illustrating a modification.

In carrying out my invention in accordance with the form shown in Figs. 1 to 3, the seat proper 10 has support in any approved manner on the automobile body 11. The back cushion of the driver's seat designated generally by the numeral 12 is independent of the back cushion 13 of the adjacent seat. The cushion 12 has its individual back 14 in front of the rigid back 15 common to the front seats. Said cushion 12 has floor support in a manner to permit it to be adjusted forward or back relatively to the seat proper 10 for which purpose in the illustrated example, I provide rigid legs 16 fastened in any suitable manner to the back 14 and extending downwardly past the seat 10 and below the latter, means being provided to afford the legs floor support in the automobile. On each leg 16 a toe or forwardly extending member is formed, projecting beneath the under side of the seat 10 a desired distance. The toe 17 and the seat 10 are provided with interlocking members to engage each other in any adjusted position of the cushion 12. In the form shown teeth 18 are formed on the toe 17 at the upper surface and mating teeth 19 are formed on the under side of a bar or plate 20 rigid with the bottom 21 of the seat 10. Two or more legs are employed in practice and each presents at the bottom a heel 22 which is afforded support in a grooved guide 23 extending longitudinally of the floor 25 of the body. If the size of the car and relative height of the seats require it, the grooved guide 23 may be secured to a block 24 rigid with the floor 25 to thus elevate said guide above the floor as shown. The seat 10 has vertical slots 26 extending from the rear edge of the seat forwardly a distance within the limits of adjustment desired for the cushion 12 relatively to seat 10.

With the described construction the slots 26 will accommodate the legs 16 and thereby permit of the legs and the cushion 12 being adjusted forward or back relatively to the front of the seat 10.

I provide spring means acting on the cushion 12 or on a part rigid therewith and tending to maintain the toe 17 in interlocked engagement with the bar 20. As one example of spring means for the purpose, I have indicated a retractile spring 27 which may be employed in any suitable number, said spring being shown as disposed between the back 14 of cushion 12 and the fixed seat back 15 and thereby tending to slightly incline the cushion 12 and hold the toe 17 in locked position as indicated in full lines, Fig. 2.

To adjust the cushion 12 forwardly from the full line position, the cushion 12 is rocked with the lower end of the heel 22 as a center, thereby disengaging the teeth 18 and 19 and permitting the legs 16 and cushion 12 to be moved forwardly. A release of the cushion enables the reaction of the spring 27 to restore the toe 17 to the locking position.

It will be observed that each leg 16 is offset laterally at its lower portion so that the members 17 and heels 22 lie at one side of the slots 26.

Figure 5:
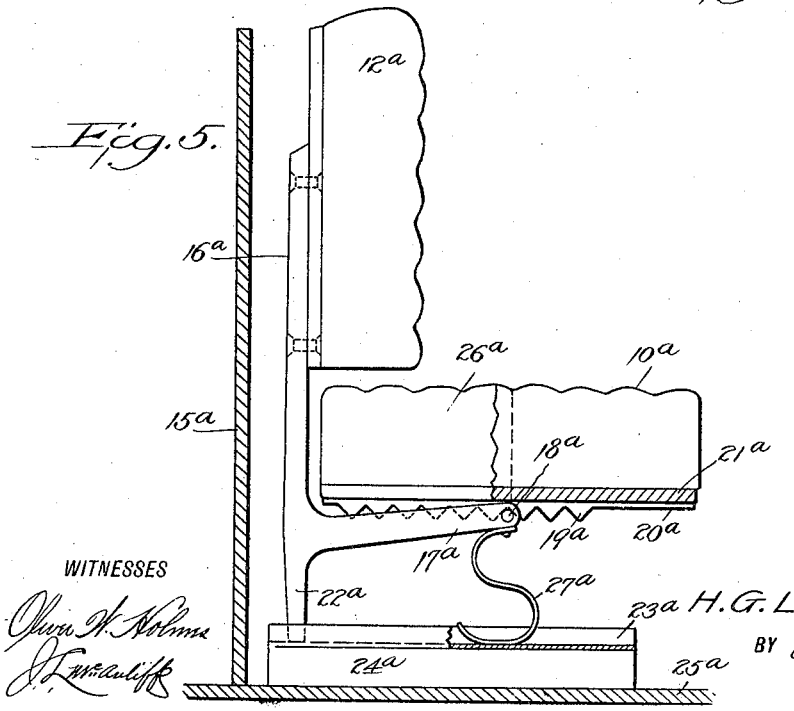
Fig. 5 is a partly sectional side elevation thereof.

In the form shown in Figs. 4 and 5, the legs 16$^a$ extend straight to the heels 22$^a$ instead of being offset and the forwardly extending toe members 17$^a$ of a pair of legs 16$^a$ are made without teeth and joined by a cross bar 18$^a$ which is adapted to engage with teeth 19$^a$ corresponding with the teeth 19 and disposed on elements on the under side of bars or plates 20$^a$ secured to the fixed seat 21$^a$ at the under side. The back 12$^a$ is secured to the seat 16$^a$ in any suitable manner and the seat 10$^a$ is formed with slots 26$^a$ corresponding with the slots 26 to receive said legs as the back is adjusted forwardly.

Instead of providing retractile springs 27 between the back 12$^a$ and the fixed seat back 15$^a$ as in the first described construction, I provide springs 27$^a$ beneath the members 17$^a$ and movable forward and back therewith, said springs in the illustrated example being seated in the grooved guides 23$^a$ provided on the blocks 24$^a$ on the bottom 25 of the machine. Thus, the legs 16$^a$ with the back 12$^a$ may be rocked with the lower ends 22$^a$ as a center to stress the springs 27$^a$ and disengage the bar 18$^a$ from the teeth 19$^a$; said reaction of the spring tending to stress upwardly on the members 17$^a$ for locking the back in the adjusted position.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. An automobile seat and a back cushion therefor having supporting means extending below said seat to have floor support independently of the seat, said cushion and its supporting means being movable forward or back relatively to said seat to dispose said cushion different distances from the front of the seat for accommodating drivers of different sizes.

2. An automobile seat and a back cushion therefor having supporting means extending below said seat to have floor support independently of the seat, said cushion and its supporting means being movable forward or back relatively to said seat to dispose said cushion different distances from the front of the seat for accommodating drivers of different sizes; together with adjustable means to effect interlocked engagement of the said seat and said back cushion in any adjusted position of the latter.

3. An automobile seat, a back therefor, independent of said seat; together with supporting means rigid with said back and extending below said seat, and a guide in which said supporting means has support to be moved forward or backward to vary the position of said back relatively to the seat.

4. An automobile seat having longitudinal slots extending forwardly therein from the rear edge thereof, a cushion back for said seat and movable forward or back relatively to the seat, legs rigid with said back and adapted to support the latter, said slots being adapted to accommodate said legs in the adjustment of the cushioned back, and means to lock said back in any adjusted position.

5. An automobile seat having longitudinal slots extending forwardly therein from the rear edge thereof, a cushion back for said seat and movable forward or back relatively to the seat, legs rigid with said back and adapted to support the latter, said slots being adapted to accommodate said legs in the adjustment of the cushioned back, means to lock said back in any adjusted position, and spring means tending to hold said back in the locked position and yielding to permit release of said back for adjusting the same.

6. An automobile seat and a cushioned back therefor adjustable forward or backward relatively to the front edge of said seat, legs rigid with said back and adapted to rockably support the latter to permit of the same being tilted relatively to the plane of the seat, coacting elements on the seat and legs adapted to interlock for holding the cushion, the back, and the legs thereof in adjusted position, and spring means tending to maintain the back in adjusted position with said coacting elements interlocked.

7. An automobile seat and a cushioned back therefor adjustable forward or backward relatively to the front edge of said seat, legs rigid with said back and adapted to rockably support the latter to permit of the same being tilted relatively to the plane of the seat, members on said seat having teeth at the under side, means rigid with the legs and adapted to engage with said teeth, and spring means tending to hold said back in adjusted position with said teeth in engagement.

HENRY GOULD LATIMER, Jr.